United States Patent
Huang et al.

(10) Patent No.: US 10,733,474 B2
(45) Date of Patent: Aug. 4, 2020

(54) METHOD FOR 2D FEATURE TRACKING BY CASCADED MACHINE LEARNING AND VISUAL TRACKING

(71) Applicant: Sony Corporation, Tokyo (JP)

(72) Inventors: Ko-Kai Albert Huang, Cupertino, CA (US); Ming-Chang Liu, San Jose, CA (US)

(73) Assignee: SONY CORPORATION, Tokyo (JP)

(*) Notice: Subject to any disclaimer, the term of this patent is extended or adjusted under 35 U.S.C. 154(b) by 97 days.

(21) Appl. No.: 16/027,021

(22) Filed: Jul. 3, 2018

(65) Prior Publication Data

US 2020/0012882 A1 Jan. 9, 2020

(51) Int. Cl.
| | |
|---|---|
| G06K 9/52 | (2006.01) |
| G06N 3/08 | (2006.01) |
| G06K 9/00 | (2006.01) |
| G06K 9/32 | (2006.01) |
| G06N 20/00 | (2019.01) |

(52) U.S. Cl.
CPC .......... *G06K 9/52* (2013.01); *G06K 9/00335* (2013.01); *G06K 9/3241* (2013.01); *G06N 3/08* (2013.01); *G06N 20/00* (2019.01); *G06K 2009/3291* (2013.01); *G06K 2209/21* (2013.01)

(58) Field of Classification Search
CPC .... G06K 9/52; G06K 9/3241; G06K 9/00335; G06K 2209/21; G06N 20/00; G06N 3/08
USPC ....................................................... 382/103
See application file for complete search history.

(56) References Cited

U.S. PATENT DOCUMENTS

| | | | |
|---|---|---|---|
| 10,055,673 B2* | 8/2018 | Burgos | G06K 9/6282 |
| 2013/0155229 A1* | 6/2013 | Thornton | H04N 7/18 348/143 |
| 2017/0061254 A1* | 3/2017 | Burgos | G06K 9/3241 |
| 2017/0116748 A1 | 4/2017 | Scutaru | |
| 2018/0322623 A1* | 11/2018 | Memo | G06N 3/084 |
| 2019/0130167 A1* | 5/2019 | Ng | G06K 9/00255 |

FOREIGN PATENT DOCUMENTS

| | | |
|---|---|---|
| CN | 103593679 | 2/2014 |
| CN | 102436590 | 5/2015 |
| CN | 103871079 | 11/2016 |

OTHER PUBLICATIONS

Eugene K. Lee, Yosuke K. Kurokawa, Robin Tu, Steven C. George & Michelle Khin; Machine learning plus optical flow: a simple and sensitive method to detect cardioactive drugs; Jul. 3, 2015; 12 pages.

* cited by examiner

*Primary Examiner* — Shahriar Behnamian
(74) *Attorney, Agent, or Firm* — Trellis IP Law Group, PC

(57) ABSTRACT

A method for 2D feature tracking by cascaded machine learning and visual tracking comprises: applying a machine learning technique (MLT) that accepts as a first MLT input first and second 2D images, the MLT operating on the images to provide initial estimates of a start point for a feature in the first image and a displacement of the feature in the second image relative to the first image; applying a visual tracking technique (VT) that accepts as a first VT input the initial estimates of the start point and the displacement, and that accepts as a second VT input the two 2D images, processing the first and second inputs to provide refined estimates of the start point and the displacement; and displaying the refined estimates in an output image.

20 Claims, 6 Drawing Sheets

Figure 2
(Prior Art)
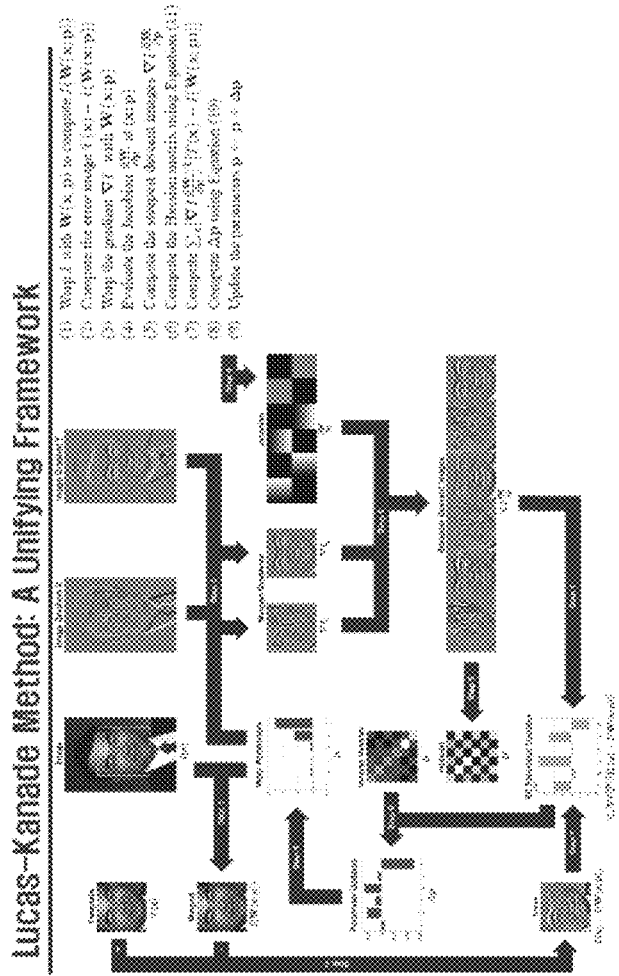

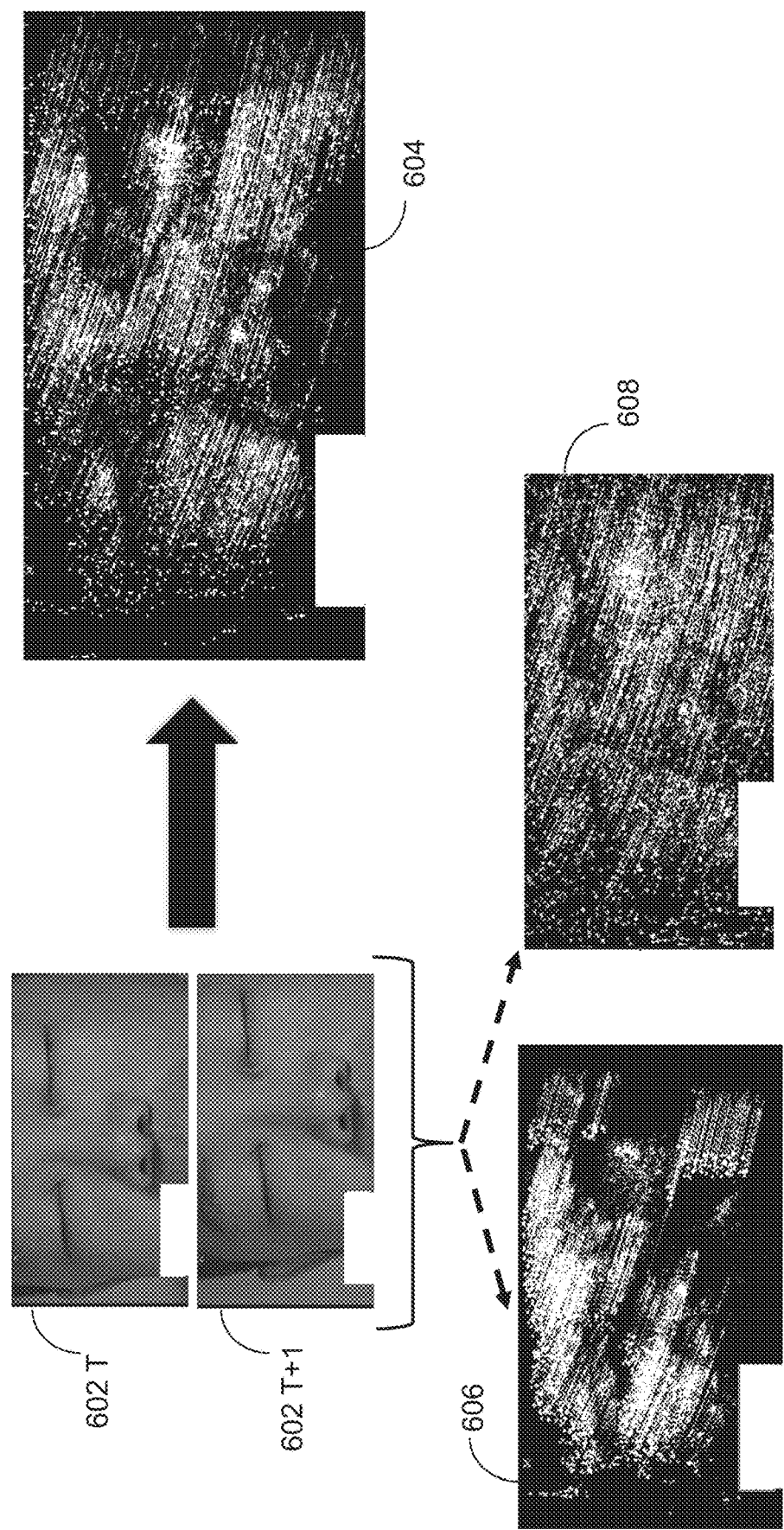

METHOD FOR 2D FEATURE TRACKING BY CASCADED MACHINE LEARNING AND VISUAL TRACKING

BACKGROUND

Feature correspondences between two 2D images is an important topic in many computer vision applications. Examples of such applications, illustrated in FIG. 1, include stereo vision, motion tracking, 3D structural imaging of moving objects (SfM), feature recognition, odometry, and simultaneous location and mapping (SLAM).

Traditionally, features were tracked using conventional visual tracking (VT) methods such as optical flow, depending on image derivatives, patch matching, correlation, or optimization. The Lucas-Kanade tracker is one implementation of an optical flow method. These methods can provide high accuracy, but there is a tradeoff with speed—the number of features tracked is normally limited because of the computational cost incurred by tracking each feature.

Recently, with advances in machine learning or deep learning, much work on this topic has been focused on using a neural network, pre-trained with mostly synthetic natural imagery, with known ground truth motion. The advantage of such machine learning methods is their speed, which can allow for real-time tracking, but their downside is their lower accuracy.

Some efforts have been made to combine the two different approaches by using MLT to detect multi-pixel features, then feeding the results to a VT module that can track the features that have been detected. These efforts have the disadvantage that the initial detection process requires specific targets, so they cannot be applied to track individual pixels without any target in mind.

There is, therefore, a need for a detection-less (meaning that every pixel is a potential feature) method of tracking features, that can provide the speed and efficiency that are characteristic of machine learning-based tracking techniques, as well as the high accuracy and reliability that are characteristic of conventional visual tracking techniques.

SUMMARY

Embodiments of the present invention generally relate to methods and systems that provide 2D feature tracking by cascaded machine learning and visual tracking. In one embodiment, a method comprises: applying a machine learning technique (MLT) that accepts as a first MLT input first and second 2D images, the MLT operating on the images to provide initial estimates of a start point for a feature in the first image and a displacement of the feature in the second image relative to the first image; applying a visual tracking technique (VT) that accepts as a first VT input the initial estimates of the start point and the displacement, and that accepts as a second VT input the two 2D images, processing the first and second inputs to provide refined estimates of the start point and the displacement; and displaying the refined estimates in an output image.

In one aspect, the method further comprises, before applying the MLT, extracting the first and second images as frames from a camera or video stream and temporarily storing the extracted first and second images in first and second image buffers. In another aspect, the MLT is trained with the use of a training database.

In another embodiment, an apparatus comprises: one or more processors; and logic encoded in one or more non-transitory media for execution by the one or more processors. When executed, the logic is operable to: apply a machine learning technique (MLT) that accepts as a first MLT input first and second 2D images, the MLT operating on the images to provide initial estimates of a start point for a feature in the first image and a displacement of the feature in the second image relative to the first image; apply a visual tracking technique (VT) that accepts as a first VT input the initial estimates of the start point and the displacement, and that accepts as a second VT input the two 2D images, processing the first and second inputs to provide refined estimates of the start point and the displacement; and display the refined estimates as an output image.

In yet another embodiment, an apparatus comprises: one or more processors; and software encoded in one or more non-transitory computer-readable media for execution by the one or more processors. When executed, the software is operable to track a 2D feature by cascaded machine learning and visual tracking, the tracking comprising: applying a machine learning technique (MLT) that accepts as a first MLT input first and second 2D images, the MLT operating on a feature present in the images to provide initial estimates of a start point for the feature in the first image and a displacement of the feature in the second image relative to the first image; applying a visual tracking technique (VT) that accepts as a first VT input the initial estimates of the start point and the displacement, and that accepts as a second VT input the two 2D images, processing the first and second inputs to provide refined estimates of the start point and the displacement; and displaying the refined estimates in an output image.

A further understanding of the nature and the advantages of particular embodiments disclosed herein may be realized by reference to the remaining portions of the specification and the attached drawings.

BRIEF DESCRIPTION OF THE DRAWINGS

FIG. 2 (Prior Art) illustrates an optical flow method for feature tracking.

FIG. 6 shows an example of a result of feature tracking according to one embodiment of the present invention, comparing it with the results of prior art approaches.

DETAILED DESCRIPTION OF EMBODIMENTS

Embodiments described herein operate on 2D images to provide a user with a feature tracked image of high accuracy at low computational cost. The present invention offers benefits over current tracking approaches by cascading two approaches in two successive stages. In the first stage, an MLT approach is used directly on a large fraction of the pixels in the input images to quickly determine rough tracking information. In the second stage, a VT approach is applied to a reduced number of image pixels corresponding to the tracking information determined in the first stage, providing more refined tracking information, which is then displayed to the user in a meaningful manner. The cascaded integration of the two approaches provides the main benefits of each of the different approaches, while avoiding the drawbacks of either approach applied alone, FIG. 2 illustrates a prior art optical flow VT method, known as the Lucas-Kanade method. This is one example of a differential method based on partial derivatives. The picture on the left hand side of the figure, taken from a publication by Baker et al ("Lucas-Kanade 20 Years: A Unifying Framework," International Journal of Computer Vision, 56(3), 221-255, 2004) pictorially illustrates the method and breaks it down into 9 mathematical steps. The picture on the right, taken from a publication by Tomasi et al (Detection and Tracking of Point Features. Carnegie Mellon University Technical Report CMU-CS-91-132, April 1991) illustrates one view of the implementation of the method in the form known as a KLT tracker, in which an iterative window search is carried out. Corner points of a large number of windows, corresponding to the various features being tracked, may be seen in the right hand picture. As discussed above, this sort of method is characterized by high accuracy accompanied by high computational demands. However, it may be very advantageously used in a second stage of a cascade, as will be described below.

Figure 1:
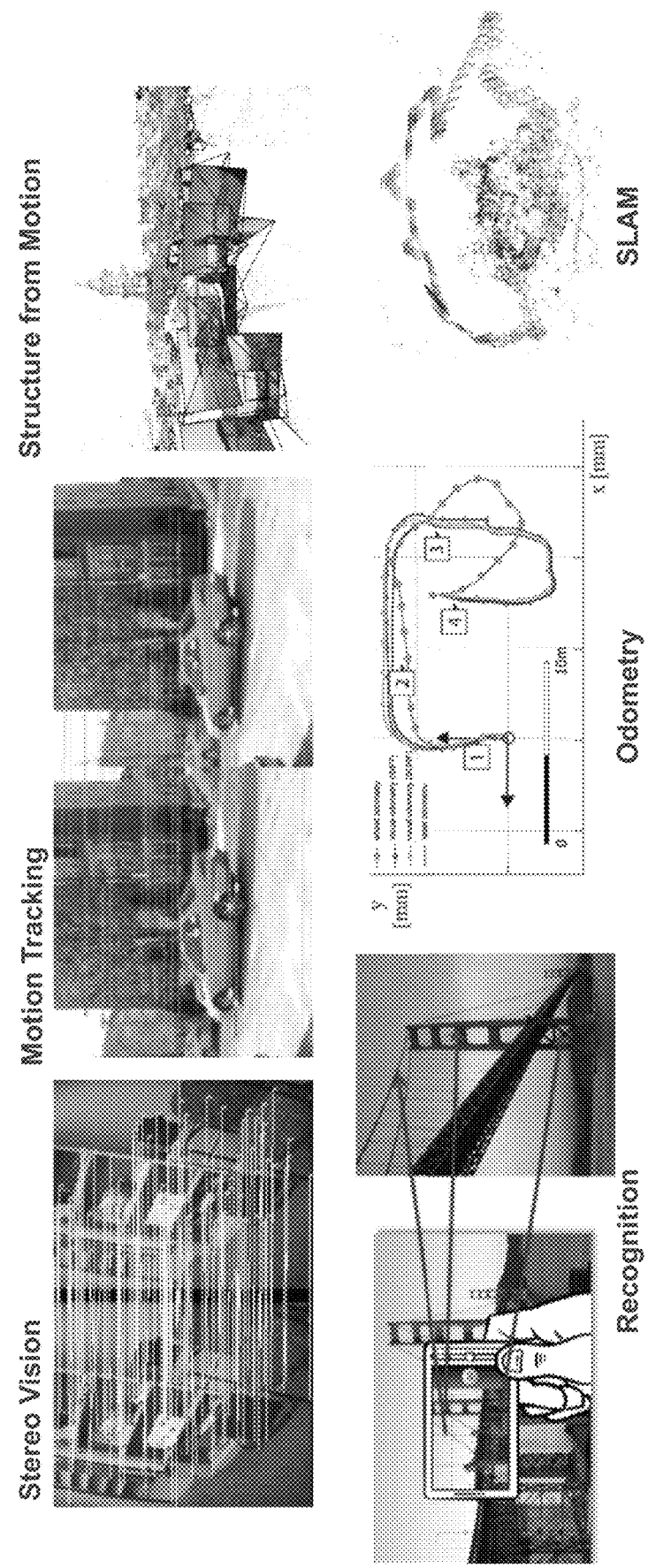
FIG. 1 illustrates examples of applications for embodiments of the present invention.
Figure 3:
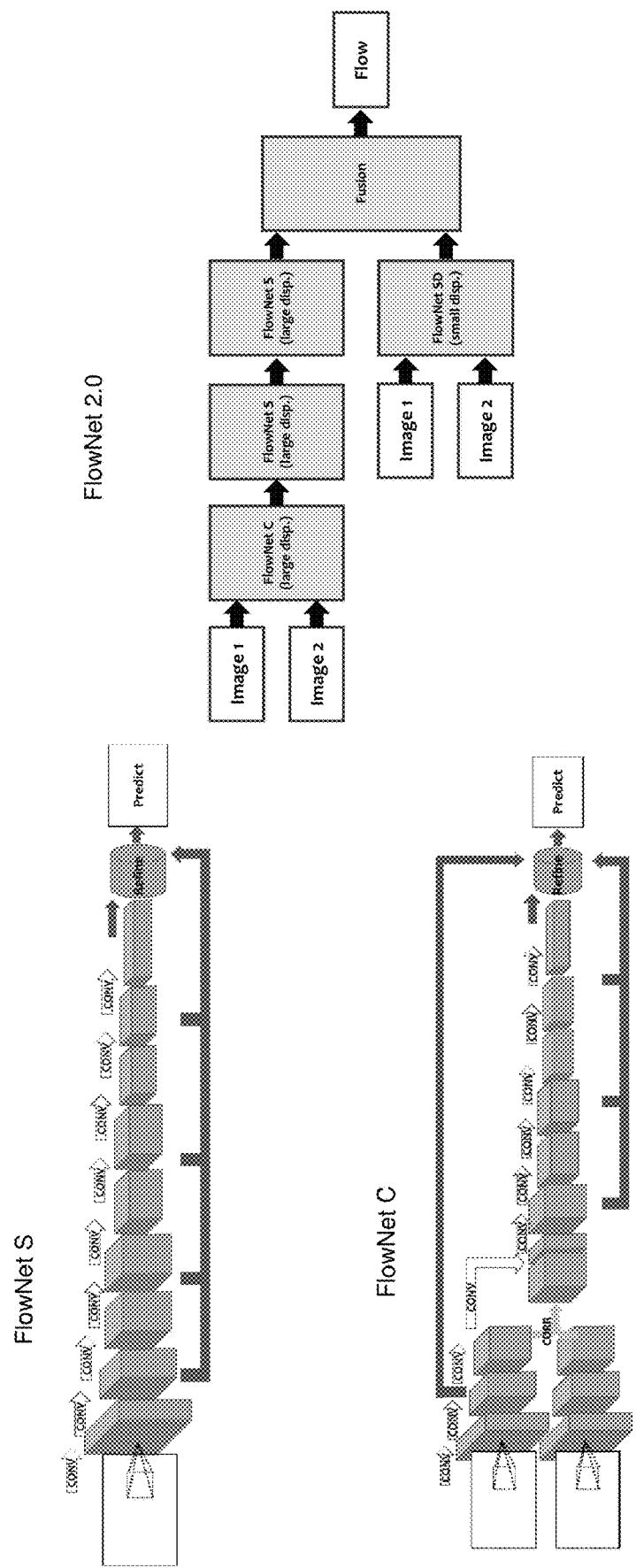
FIG. 3 (Prior Art) illustrates some machine learning based methods for feature tracking.

FIG. 3 illustrates three versions of a prior art machine learning-based method for feature tracking, which may be described as end-to-end flow estimation. FlowNetS, featured at the top left, uses a generic deep convolutional neural network (CNN) architecture, with 2 input images, stacked. FlowNetC, featured at the lower left, explicitly correlates between 2 input image features. FlowNet 2.0, featured at the right, integrates FlowNetS & FlowNet C with a third version, FlowNet-SD, which is specialized to improve the determination of small displacements.

Figure 4:
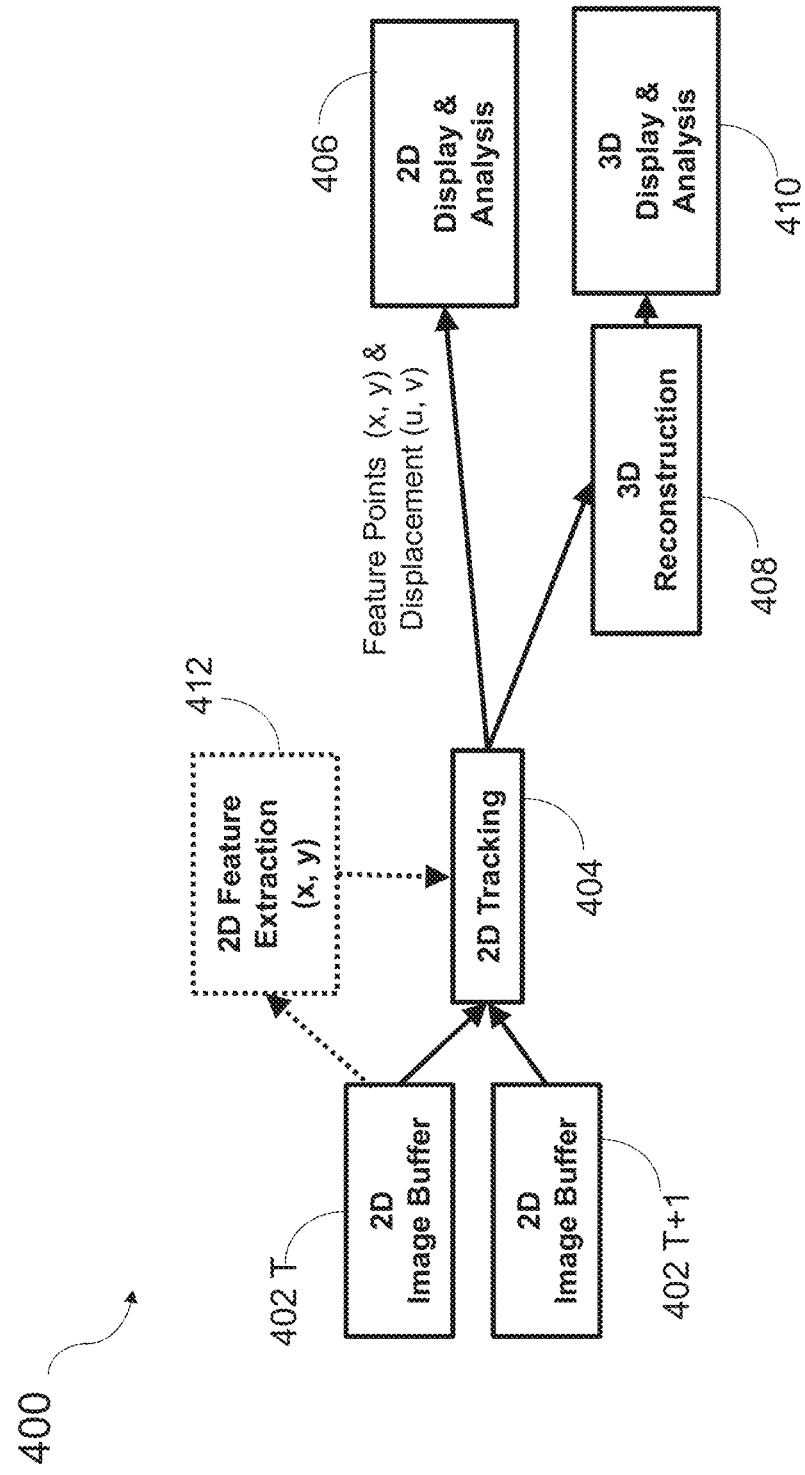
FIG. 4 schematically illustrates a system for feature tracking according to some embodiments of the present invention.

FIG. 4 is a high level schematic view of a system 400 including functional flow through such a system according to some embodiments of the present invention. 2D image buffers 402 T and 402 T+1 deliver images or frames captured at time points T and T+1 respectively to 2D tracking sub-system 404. In some embodiments, an additional optional 2D feature extraction pathway is followed from buffer 402 T to 2D feature extraction module 412, with the feature extraction result also being delivered to 2D tracking sub-system 404. While such feature extraction is not a necessary step in the present invention, it may be of some benefit in certain cases.

Sub-system 404 operates on the images and, in some cases, on the output of module 412, to generate image feature tracking data that are indicative of position and displacement. In some embodiments the data generated by sub-system 404 are sent to module 406, for 2D display and analysis. In some embodiments, the data generated by sub-system 404 are sent to 3D reconstruction module 408 to generate one or more 3D images and thence to module 310 for 3D display and analysis.

Figure 5:
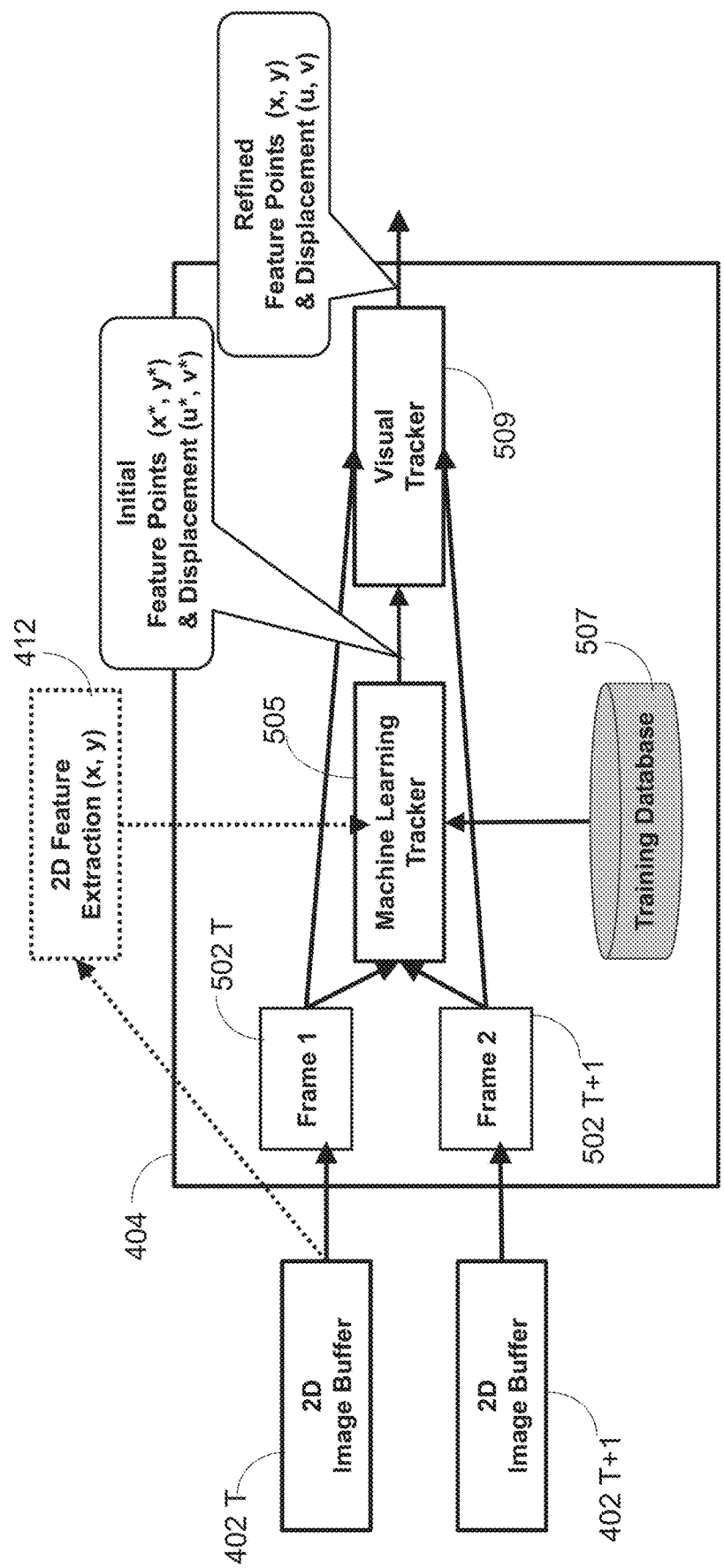
FIG. 5 schematically illustrates part of a system for feature tracking according to some embodiments of the present invention.

FIG. 5 illustrates part of the system shown in FIG. 4, with particular regard to details of functional flow through components of 2D tracking sub-system 404. As noted above, 2D image buffers 402 T and 402 T+1 deliver images or frames captured at time points T and T+1 respectively to 2D tracking sub-system 404. In the first stage of sub-system 404, image data in the two frames 502 T and 502 T+1 are input into machine learning tracker (MLT) 505. As noted with regard to FIG. 4, module 412 may optionally be present in some embodiments to carry out feature extraction on the frames, providing a third input to MLT tracker 505.

MLT tracker 505, trained by data input from training database 507, operates at a pixel-by pixel level on substantially the entirety of frames 502 T and 502 T+1, using a method such as one of the FlowNet processes depicted in FIG. 4 to output initial estimates of position and displacement of feature points in frames 502 T and 502 T+1. Because of the computational speed and simplicity of machine learning techniques, often using CNN architectures, these tracking estimates for a relatively large number of feature points of interest may be generated quite quickly and conveniently.

The initial estimates are then input to VT tracker module 509, where a standard visual tracking technique, such as the KLT implementation of the optical flow method, may be applied to the image pixels for the features that MLT tracker 505 has already determined to be of interest. VT module 509 is then able to generate more accurate, refined values of position and displacement for those features. While VT module 509 does not perform feature tracking over all the pixels in the frames, module 509 does receive image data in the two frames 502 T and 502 T, because the visual tracking technique requires neighboring pixel information around the features of interest.

FIG. 6 illustrates the results of using a method of the present invention on an exemplary pair of images of a face, allowing them to be compared with the results obtained simply using one or the other of two methods of the prior art. Image 602 T and 602 T+1 are shown on the top left of the figure. The broad horizontal arrow shows the result of feeding data from these images through a cascaded MLT-VT system of the present invention, such as system 400 shown in FIG. 4 and FIG. 5. The composite image 604 on the top right, showing superimposed white streaks on a black and white rendering of the face, indicative of a sweeping motion, constitute the feature tracking results of one particular embodiment of the present invention. Composite images 606 and 608 shown on the bottom left and bottom center of the figure show feature tracking results that would be obtained using either a traditional VT method, or an MLT method respectively on those same images, 602 T and 602 T+1.

The result of applying VT alone, as shown in image 606, exhibits relatively sparse coverage, as coverage is limited by reasonably available computational resources, while the result of applying MLT alone, shown in image 608, suffers from relatively high background noise, which limits accuracy. The result of applying a cascaded system, image 504, offers a combination of dense coverage and low background noise, providing accurate and reliable tracking.

Embodiments described herein provide various benefits to applications requiring feature tracking across sequential 2D images. In particular, embodiments combine the benefits of two different currently used feature tracking approaches, by cascading them in an innovative two-stage process that avoids the need to detect multi-pixel features of interest in the initial images. In the first stage of embodiments of the present invention, a fast and computationally inexpensive pixel-by-pixel MLT tracking method is carried out to provide rough or initial estimates of features, that are thus automatically determined to be of interest. In the second stage, just those features are tracked by a higher accuracy VT method.

Although the description has been described with respect to particular embodiments thereof, these particular embodiments are merely illustrative, and not restrictive. The MLT tracker, for example, need not be based on a CNN architecture.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for 2D feature tracking by cascaded machine learning and visual tracking, the method comprising:
   a first stage of feature tracking using a machine learning technique (MLT) that-accepts as a first MLT input first and second 2D images, the MLT operating on a large fraction of pixels within each of the images to provide initial estimates of a start point for a feature in the first 2D image and a displacement of the feature in the second 2D image relative to the first image; and
   a second stage of feature tracking following the first stage, the second stage using a visual tracking technique (VT) that accepts as a first VT input the initial estimates of the start point and the displacement, and that accepts as a second VT input the first and second 2D images, processing the first VT input and a reduced number of image pixels in the second VT input to provide refined estimates of the start point and the displacement; and
   displaying the refined estimates in an output image;
   wherein no refined estimates are sent from the second stage of feature tracking to the first stage of feature tracking.

2. The method of claim 1 further comprising, before applying the MLT:
   extracting the first and second images as frames from a camera or video stream; and
   temporarily storing the extracted first and second images in first and second image buffers.

3. The method of claim 2, further comprising, before applying the MLT:
   applying a 2D feature extraction technique to the first 2D image to identify the feature; and
   providing information on the identified feature as a second MLT input.

4. The method of claim 1, wherein the MLT is trained with the use of a training database.

5. The method of claim 1, wherein the MLT uses a convolutional neural network.

6. The method of claim 1 wherein the VT comprises an optical flow method.

7. The method of claim 6 wherein the optical flow method is carried out by a KLT Tracker.

8. The method of claim 2, further comprising, after applying the VT:
   using the refined estimates of the start point and the displacement to generate a 3D reconstruction image; and
   displaying and analyzing the 3D image.

9. The method of claim 1, wherein displaying the refined estimates in an output image comprises displaying the refined estimates in graphical form superimposed on one of the first 2D image, the second 2D image, and a composite version of the first and second 2D images.

10. An apparatus comprising:
    one or more processors; and
    logic encoded in one or more non-transitory media for execution by the one or more processors and when executed operable to:
    in a first stage, apply a machine learning technique (MLT) that accepts as a first MLT input first and second 2D images, the MLT operating on a large fraction of pixels within each of the images to provide initial estimates of a start point for a feature in the first 2D image and a displacement of the feature in the second 2D image relative to the first image;

in a second stage, following the first stage, apply a visual tracking technique (VT) that accepts as a first VT input the initial estimates of the start point and the displacement, and that accepts as a second VT input the first and second 2D images, processing the first VT input and a reduced number of image pixels in the second VT input to provide refined estimates of the start point and the displacement; and display the refined estimates as an output image;

wherein no refined estimates are sent from the second stage to the first stage.

11. The apparatus of claim 10, wherein the logic when executed is further operable, before applying the MLT, to:
extract the first and second images as frames from a camera or video stream; and
temporarily store the extracted first and second images in first and second image buffers.

12. The apparatus of claim 11, wherein the logic when executed is further operable, before applying the MLT, to:
apply a 2D feature extraction technique to the first 2D image to identify the feature; and
provide information on the identified feature as a second MLT input.

13. The apparatus of claim 10, wherein the MLT is trained with the use of a training database.

14. The apparatus of claim 10, wherein the MLT uses a convolutional neural network.

15. The apparatus of claim 10, wherein the VT comprises an optical flow method.

16. The apparatus of claim 15, wherein the optical flow method is carried out by a KLT Tracker.

17. An apparatus comprising:
one or more processors; and
software encoded in one or more non-transitory computer-readable media for execution by the one or more processors and when executed operable to track a 2D feature by cascaded machine learning and visual tracking, the tracking comprising:
in a first stage, applying a machine learning technique (MLT) that accepts as a first MLT input first and second 2D images, the MLT operating on a large fraction of pixels within each of the images to provide initial estimates of a start point for a feature in the first 2D image and a displacement of the feature in the second 2D image relative to the first image;
in a second stage following the first stage, applying a visual tracking technique (VT) that accepts as a first VT input the initial estimates of the start point and the displacement, and that accepts as a second VT input the first and second 2D images, processing the first VT input and a reduced number of image pixels in the second VT input to provide refined estimates of the start point and the displacement; and
displaying the refined estimates in an output image;
wherein no estimates are sent from the second stage to the first stage.

18. The apparatus of claim 17, wherein the tracking further comprises, before applying the MLT:
extracting the first and second images as frames from a video stream; and
temporarily storing the extracted first and second images in first and second image buffers.

19. The apparatus of claim 17, wherein the MLT uses a convolutional neural network, and wherein the VT comprises an optical flow method.

20. The apparatus of claim 17, wherein displaying the refined estimates in an output image comprises displaying the refined estimates in graphical form superimposed on one of the first 2D image, the second 2D image, and a composite version of the first and second 2D images.

* * * * *